(12) United States Patent  
Arigaya

(10) Patent No.: US 9,223,433 B2  
(45) Date of Patent: Dec. 29, 2015

(54) DISPLAY SYSTEM AND DISPLAY METHOD

(71) Applicant: Kazuhisa Arigaya, Tokyo (JP)

(72) Inventor: Kazuhisa Arigaya, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 2 days.

(21) Appl. No.: 14/167,233

(22) Filed: Jan. 29, 2014

(65) Prior Publication Data

US 2014/0253480 A1    Sep. 11, 2014

(30) Foreign Application Priority Data

Mar. 11, 2013  (JP) ................ 2013-047708

(51) Int. Cl.
| | |
|---|---|
| G06F 3/041 | (2006.01) |
| G06F 1/16 | (2006.01) |
| G06F 3/0488 | (2013.01) |
| G06F 3/14 | (2006.01) |

(52) U.S. Cl.
CPC ............ *G06F 3/0416* (2013.01); *G06F 1/1694* (2013.01); *G06F 3/04883* (2013.01); *G06F 3/04886* (2013.01); *G06F 3/1446* (2013.01)

(58) Field of Classification Search
CPC ............ G09G 5/00; G09G 2300/0814; G09G 2310/04; G06F 3/0416
See application file for complete search history.

(56) References Cited

U.S. PATENT DOCUMENTS

| | | | |
|---|---|---|---|
| 2005/0017957 A1* | 1/2005 | Yi ................................. | 345/173 |
| 2006/0087502 A1* | 4/2006 | Karidis et al. ............... | 345/211 |
| 2006/0227122 A1* | 10/2006 | Proctor ......................... | 345/204 |
| 2010/0283860 A1* | 11/2010 | Nader ......................... | 348/222.1 |
| 2012/0038571 A1* | 2/2012 | Susani ......................... | 345/173 |

FOREIGN PATENT DOCUMENTS

JP    2003-271118    9/2003

* cited by examiner

*Primary Examiner* — Adam R Giesy  
(74) *Attorney, Agent, or Firm* — Oblon, McClelland, Maier & Neustadt, L.L.P.

(57) ABSTRACT

A display system is disclosed. The display system includes a display unit configured to include a sensor which detects an operation in a display area of the display unit, a determination unit configured to determine an effective area of the display area of the display unit, the effective area being an area on which an image is displayed, and a first control unit configured to disable the operation detection outside the effective area by the sensor.

5 Claims, 12 Drawing Sheets

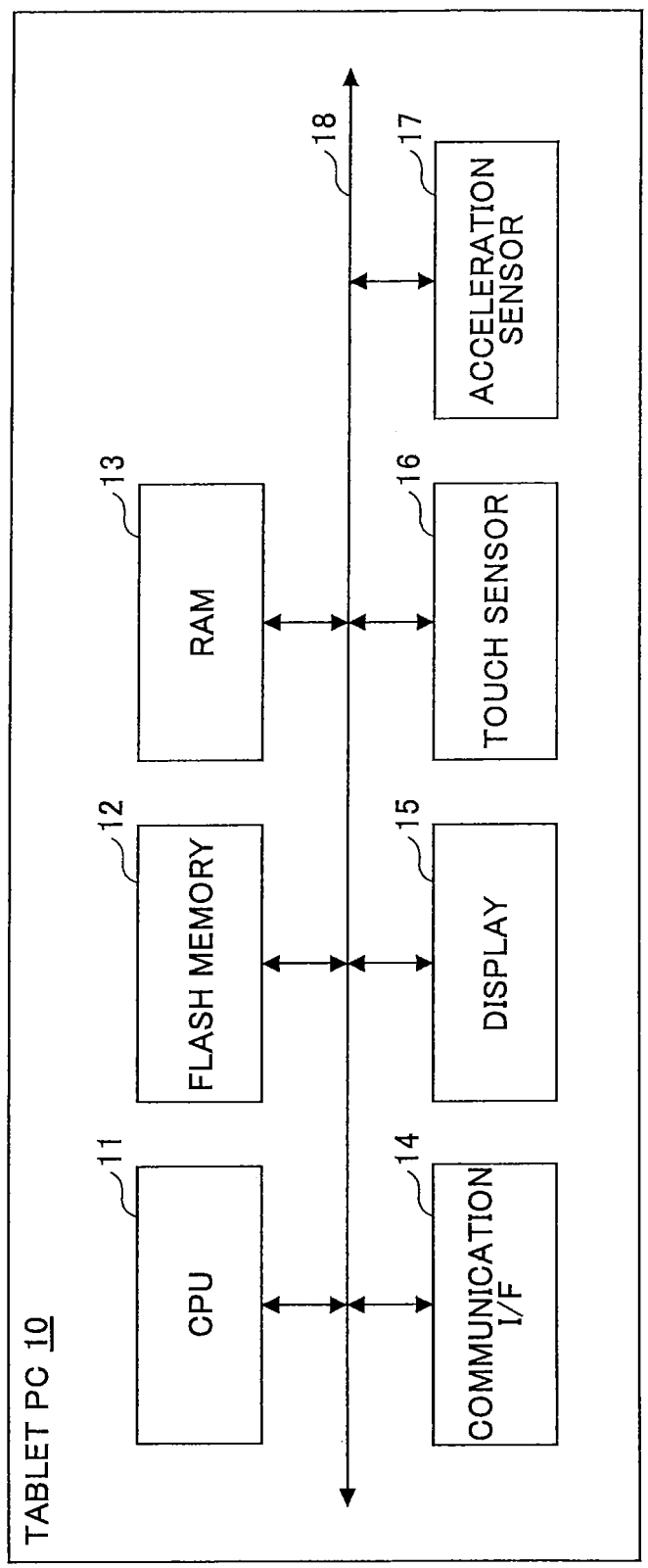

FIG.5

| VIRTUAL OPERATION ELEMENT ID | LOCATION & SIZE INFORMATION | FUNCTION | OPERATION ELEMENT IMAGE |
|---|---|---|---|
| 1 | (X1, Y1), (WIDTH, HEIGHT) | SLEEP | ○ |
| 2 | (X2, Y2), (WIDTH, HEIGHT) | HOME BUTTON | △ |
| ... | ... | ... | ... |
| n | (Xn, Yn), (WIDTH, HEIGHT) | | |

DISPLAY SYSTEM AND DISPLAY METHOD

BACKGROUND OF THE INVENTION

1. Field of the Invention

The disclosures herein generally relate to a display system and a display method.

2. Description of the Related Art

Conventionally, a multi-display technique is known in which, in order to display a large-size image, multiple liquid crystal displays or projectors are laid out next to each other and caused to work together to display the large-size image. Also, a technique is known in which multiple tablet-type mobile information terminals, which are rapidly becoming popular these days, are used for implementing the same type of multi-display technique as described above. This kind of technique is disclosed in, for example, Patent Document 1.

In the meantime, because it is assumed that conventional small mobile information terminals including tablet-type terminals are used in a hand-held manner when they are used as a stand-alone terminal, it is common that the area outside their screen is covered by a relatively wide-width bezel.

[Patent Document 1] Japanese Patent Application Publication No. 2003-271118

SUMMARY OF THE INVENTION

It is a general object of at least one embodiment of the present invention to provide a way to use a display apparatus with a narrow-width bezel comfortably.

A display system according to the present embodiment includes a display unit configured to include a sensor which detects an operation in a display area of the display unit, a determination unit configured to determine an effective area of the display area of the display unit, the effective area being an area on which an image is displayed, and a first control unit configured to disable the operation detection outside the effective area by the sensor.

With the above configuration, it becomes possible to use a display apparatus with a narrow-width bezel comfortably.

BRIEF DESCRIPTION OF THE DRAWINGS

Other objects and further features of embodiments will become apparent from the following detailed description when read in conjunction with the accompanying drawings.

FIG. 1 is a block diagram illustrating a hardware configuration of a tablet PC which is an embodiment of a display system or a display apparatus according to the present invention.

FIG. 5 is a drawing illustrating examples of data of virtual operation elements.

DESCRIPTION OF THE PREFERRED EMBODIMENTS

Figure 2A:
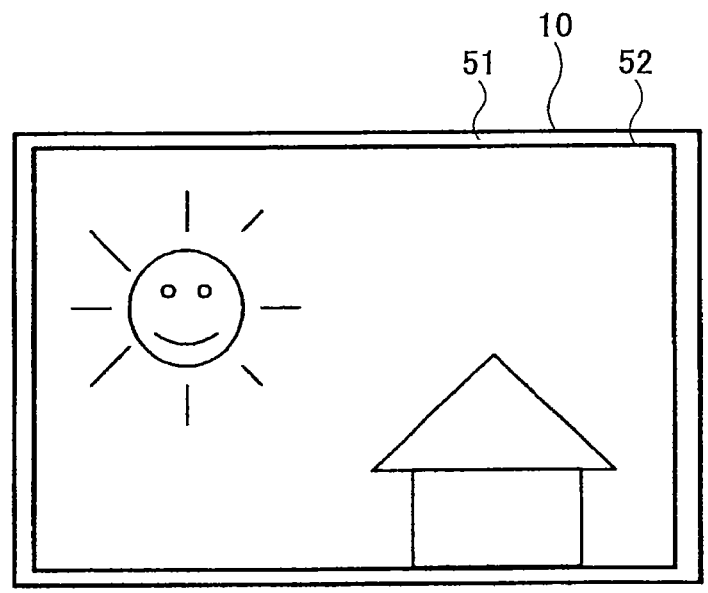
FIG. 2A is a drawing illustrating a display example of the tablet PC in an entire-display mode shown in FIG. 1.

In the following, embodiments of the present invention will be described with reference to the accompanying drawings. In FIG. 1, a hardware configuration of a tablet PC 10 which is an embodiment of a display system or a display apparatus according to the present invention is shown. As shown in FIG. 1, the tablet PC 10 includes a CPU 11, a flash memory 12, a RAM 13, a communication interface 14, a display 15, a touch sensor 16 and an acceleration sensor 17, which are connected to each other via a system bus 18.

By causing the CPU 11 to execute a program stored in the flash memory, using the RAM 13 as a work area, operations of the tablet PC 10 as a whole are controlled and various functions are implemented including a function of controlling a frame and a virtual operation element, which will be described later.

The flash memory 12 is a rewritable non-volatile memory unit for storing the program the CPU 11 executes and data that should be kept after the power supply is disconnected. The RAM 13 is a volatile memory unit which is used as a work area of the CPU 11, or used for storing data temporarily. The communication I/F 14 is an interface for communication with various external apparatuses including a screen-control server 100 which will be described later. Here, it is assumed that wireless communications are available. Other types of communications may be available. Protocols used for the communications may be any protocol. Multiple interfaces may be available.

The display 15 is a display unit for displaying an image in a predefined display area. The touch sensor 16 is embedded in a layer of the display 15, and is capable of detecting an operation in the display area of the display 15. Here, the touch sensor is assumed to be a sensor for detecting an operation of touching a cover glass that covers the surface area of the display 15. A contactless sensor that detects an operation without contact may be used.

The acceleration sensor 17 is a sensor for measuring a direction and a degree of acceleration which is applied to the tablet PC 10. The acceleration to be detected includes a gravitational acceleration. Therefore, the acceleration sensor 17 is capable of detecting a direction in which the tablet PC 10 is facing based on the direction of the gravitational force. For example, the acceleration sensor can determine whether the display surface of the display 14 is orthogonal to the direction of the gravitational force (as in the case of the display surface facing upward and being placed on the horizontal surface of a table), or tilted, etc. Also, in the case where the tablet PC 10 is moved, the direction and the distance of the movement can be roughly measured through the change of the acceleration.

An external appearance of the tablet PC described above is shown in FIG. 2A. In other words, almost an entire area of a surface of the tablet PC 10 is occupied by a display area 52 of the display 15, leaving only a narrow-width area for a frame 51.

Figure 2B:
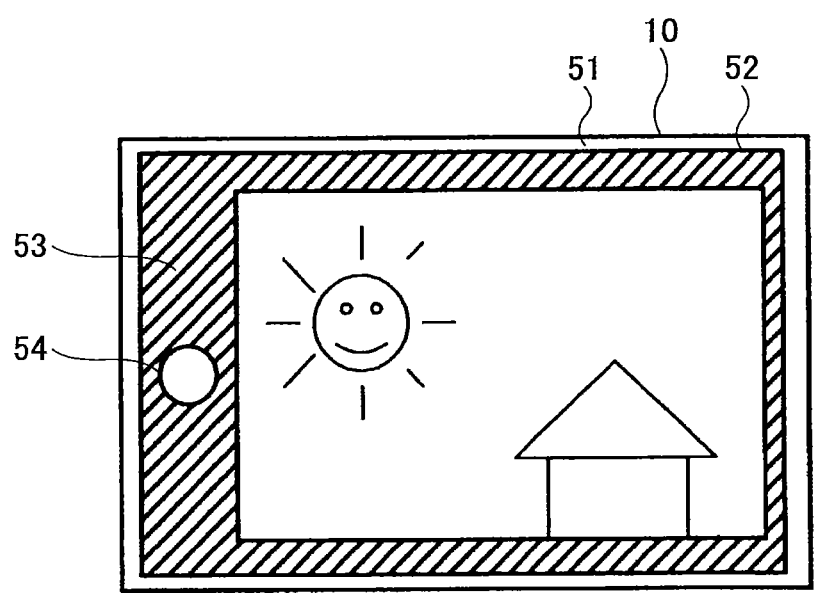
FIG. 2B is a drawing illustrating a display example of the tablet PC in a partial-display mode.

Here, display examples of the tablet PC 10 in the two modes are shown in FIG. 2A and FIG. 2B. What is shown in FIG. 2A is a display example of the entire-display mode (the first mode) where the entire area of the display area 52 of the display 15 is used for displaying a screen. This mode is suitable for the multi-display function in which multiple tablet PCs 10 work together to display a large-size screen.

What is shown in FIG. 2B is a display example of the partial-display mode (the second mode) where a peripheral area 53 of the display area 52 is used as the frame, and the remaining area is used for displaying a screen. This mode is suitable for the case where the tablet PC 10 is used as a standalone terminal and held by the user's hand. In the partial-display mode, in the peripheral area 53 as the frame, a detection of operation by the touch sensor 16 is disabled and a predefined frame image is displayed on the display 15. The frame image may be any fixed image. The frame image may be a set of pixels that are not lit and showing nothing. It may be some sort of moving image.

Also, in the peripheral area 53, there is a virtual button 54 as an operation element implemented by a "display-type" part. In the peripheral area 53, the detection of operation by the touch sensor 16 is not disabled in the area where the virtual button 54 is displayed so that in the case where there is an operation of the virtual button 54, the CPU 11 can detect it. One of the features of the tablet PC 10 is that it has the entire-display mode and the partial-display mode, and the two modes can be switched.

Figure 3:
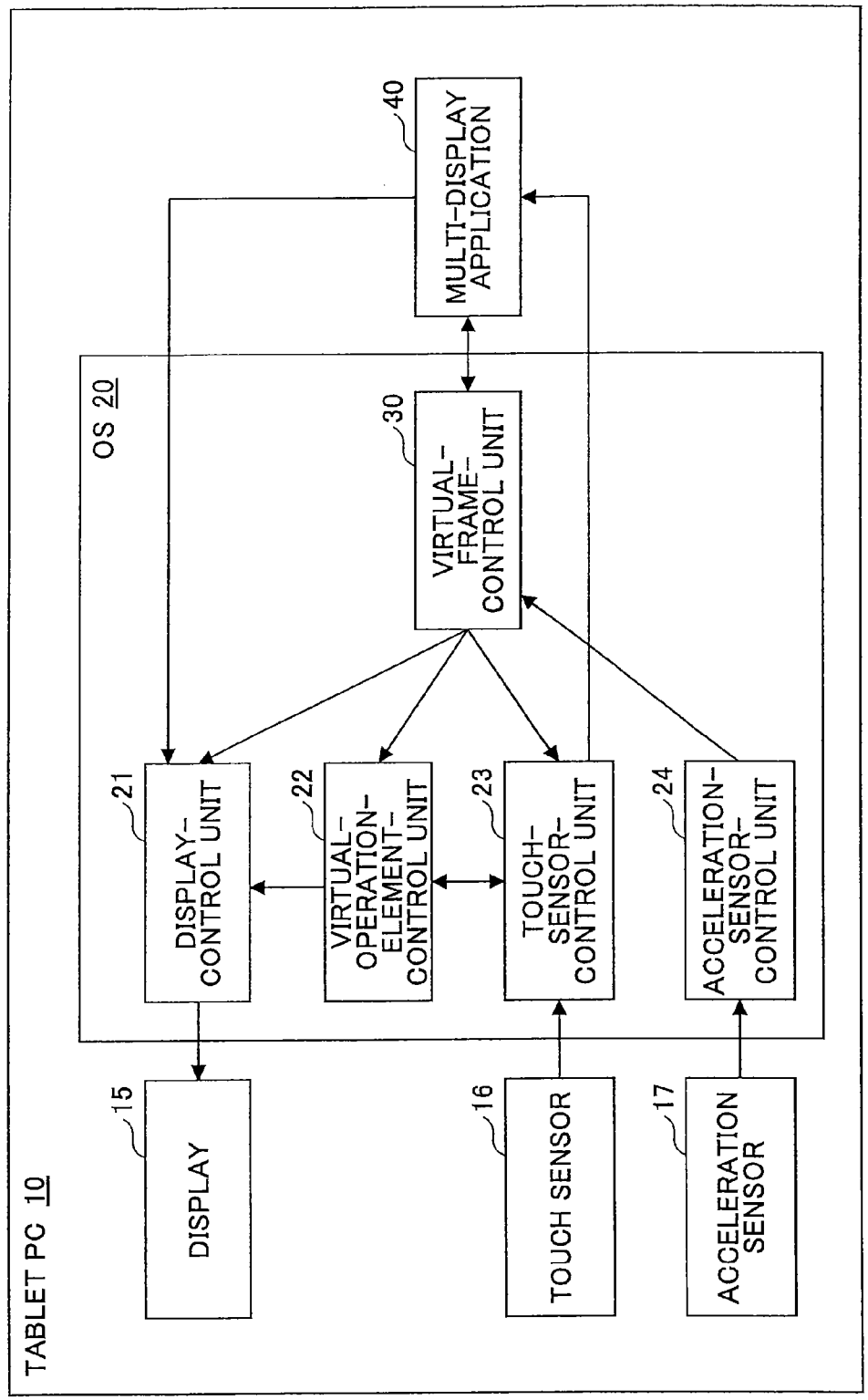
FIG. 3 is a drawing illustrating a functional block diagram of the tablet PC shown in FIG. 1.

Next, a function of the tablet PC 10 which enables the switching of the modes will be described. FIG. 3 is a drawing illustrating a functional block diagram of the tablet PC 10. In FIG. 3, only a portion which is related to the mode switching is shown.

As shown in FIG. 3, the tablet PC 10 includes, as functional units of an operating system (OS) 20, a display-control unit 21, a virtual-operation-element-control unit 22, a touch-sensor-control unit 23, an acceleration-sensor-control unit 24 and a virtual-frame-control unit 30. Also, other than the above units, the tablet PC 10 includes a multi-display application 40. The display 15, the touch sensor 16 and the acceleration sensor 17 are hardware shown in FIG. 1.

The display-control unit 21 provides a function of controlling the display 15. Specifically, the display-control unit 21 generates a predefined number of pixels of an image and displays them based on the screen data requested to be displayed by various applications (including the multi-display application 40) and based on the screen data which are requested to be displayed by the functions of the OS 20.

The predefined number of pixels in the entire-display mode are the number of pixels of the entire display area of the display 15. The predefined number of pixels in the partial-display mode are the number of pixels of the effective area where the images are displayed in this mode. Therefore, in the partial-display mode, a shrunken image is displayed on the display 15 compared to the entire-display mode. Also, in the partial-display mode, the display 15 is controlled so that the display location of the image corresponds to the location of the display area excluding the peripheral area 53. Also, the display-control unit 21 controls the display 15 to display the frame image in the peripheral area 53, and to display the virtual button 54 in the partial-display mode.

The virtual-operation-element-control unit 22 provides a function of controlling an operation element such as the virtual button 54 in the peripheral area 53 in the partial-display mode. The content of this control will be described later using FIG. 4 and FIG. 5.

The touch-sensor-control unit 23 provides a function of controlling the touch sensor 16. Specifically, the touch-sensor-control unit 23 transmits information indicating the content of an operation detected by the touch sensor 16 to an application, which has generated the screen currently being displayed, or to the OS 20. Note that, in the partial-display mode, the information of the operation in the peripheral area 53 is not transmitted to the application nor the OS 20 but is discarded so that the detection of the operation in the peripheral area 53 is disabled. The information that defines the peripheral area 53 is, together with a mode-transition request, transmitted from the virtual-frame-control unit 30 during a transition to the partial-display mode. Note that the operation applied to the location of the virtual operation element such as the virtual button 54 in the peripheral area 53 is not disabled, and the information indicating the content of the operation is transmitted to the virtual-operation-element-control unit 22. Information of the location of the operation element is provided by the virtual-operation-element-control unit 22.

The acceleration-sensor-control unit 24 provides a function of controlling the acceleration sensor 17. Here, in the case where it is determined that the tablet PC 10 is moved to a tilted position based on the acceleration detection result by the acceleration sensor 17, the same is reported to the virtual-frame-control unit 30. For example, it can be determined that the tablet PC 10 is moved to the tilted position in the case where "the detected direction" and "the strength of the acceleration" are changed to more than a certain extent from "the direction is orthogonal to the display area of the display 15 and facing the opposite surface" and "the strength is 1G". In addition to the case described above, it may be reported to the virtual-frame-control unit 30 in the case where a certain movement of the tablet PC 10 is detected which indicates that a human being is applying a certain force. The certain movement is: the tablet PC 10 is being quickly rotated on a table; or, the tablet PC 10 held in hand is being moved up and down. Reference values for identifying the movement are set in advance in the acceleration-sensor-control unit 24.

The virtual-frame-control unit 30 is a switching unit for switching between the entire-display mode and the partial-display mode. The switching is performed based on a request received through the multi-display application from a screen-control server 100 which will be described later, or based on a report, which indicates that the tablet PC 10 is moved, transmitted by the acceleration-sensor-control unit 24. In the case where the switching is performed, the virtual-frame-control unit 30 transmits a mode-transition request to each of the display-control unit 21, the virtual-operation-element-control unit 22 and the touch-sensor-control unit 23 so that each of them starts processes in accordance with the changed mode. The processes will be described later using FIG. 10 through FIG. 12.

The multi-display application 40 is an application that runs on the OS 20 in the tablet PC 10, and provides a function that, together with the screen-control server 100 which will be described later, causes the tablet PC 10 to perform the multi-display function.

Specifically, the multi-display application 40 provides a function of transmitting a mode-switching request, which is transmitted by the screen-control server 100, to the virtual-frame-control unit 30. Also, the multi-display application 40 provides a function of transmitting a divided image for the multi-display function, transmitted by the screen-control server 100, to the display-control unit 21 and causing the image to be displayed on the display 15. Also, the multi-display application 40 provides a function of, in order to register the tablet PC 10 in the screen-control server 100 for the purpose of the multi-display function, transmitting necessary data to the screen-control server 100 automatically or in accordance with a user operation. This function will be described later in the description of FIG. 7.

Figure 4:
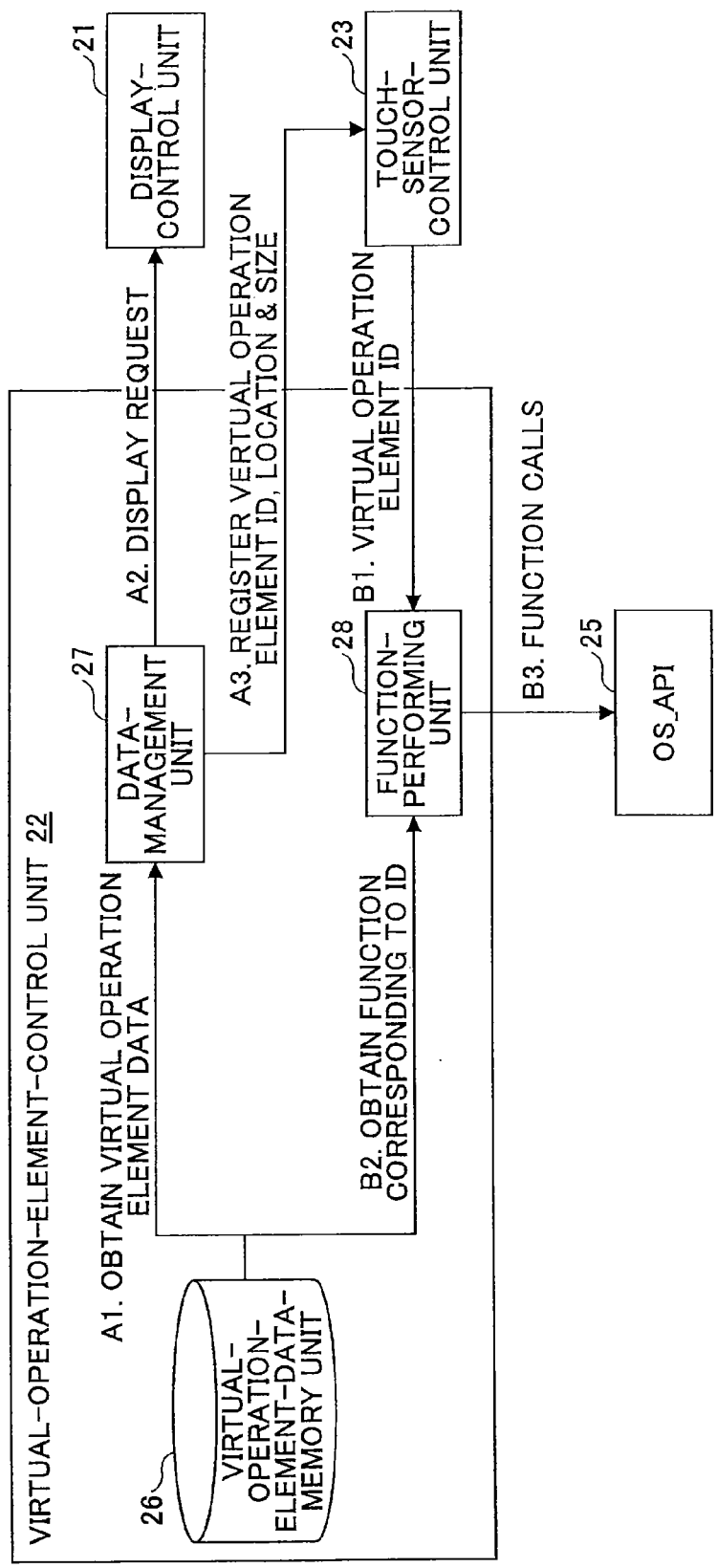
FIG. 4 is a drawing illustrating a detailed functional block diagram of a virtual-operation-element-control unit.

Next, in FIG. 4, the detailed function of the virtual-operation-element-control unit 22 is shown. In FIG. 5, examples of data of the virtual operation elements stored in a virtual-operation-element-data-memory unit 26 of FIG. 4 are shown. As shown in FIG. 4, the virtual-operation-element-control unit 22 includes the virtual-operation-element-data-memory unit 26, a data-management unit 27 and a function-performing unit 28.

The virtual-operation-element-data-memory unit 26 stores the virtual operation element data which indicate the virtual operation elements. The virtual operation element data are shown in FIG. 5, and include a virtual operation element ID, location-and-size information, a function, and an operation element image.

The virtual operation element ID is identification information for identifying the virtual operation element. The location-and-size information is information indicating the location at which the image of the virtual operation element is displayed on the display 15 and the size of the image. The function indicates a process which should be performed in the case where the virtual operation element is operated. The content of the process may be specified by a program or commands to be executed. Here, the process is specified by functions which are transmitted to an OS_API (application program interface) 25 provided by the OS 20. The operation element image is image data which are used for displaying the virtual operation element. The operation element image may be a link or a path to the image file.

Note that here the virtual operation element is a button. A slider, a toggle switch, or various types of operation elements may be used. In this case, information indicating a type of operation element may be included in the virtual operation element data.

Also, the data-management unit 27 provides a function of managing the virtual operation element data stored in the virtual-operation-element-data-memory unit 26. The function-performing unit 28 provides a function of, in the case where the virtual operation element is operated, requesting the OS 20 for a process based on the virtual operation element data corresponding to the operation.

In FIG. 4, A1 through A3 indicate processes that are performed by the units above during the transition from the entire-display mode to the partial-display mode. B1 through B3 indicate processes performed by the units above in the case where operations of the virtual operation elements are detected by the touch-sensor-control unit 23 in the partial-display mode. In the tablet PC 10, when the virtual-frame-control unit 30 requests the virtual-operation-element-control unit 22 to move to the partial-display mode, the data-management unit 27 reads all of the virtual operation element data from the virtual-operation-element-data-memory unit 26 (A1).

Next, the data-management unit 27, based on the location-and-size information and the button image, requests the display-control unit 21 to display the virtual operation element (A2). Upon receiving the request, the display-control unit 21 displays the image of the virtual operation element on the display 15 in accordance with the request. Also, the data-management unit 27 requests the touch-sensor-control unit 23 to register data of the virtual operation element ID and the corresponding location-and-size information (A3). Upon receiving the request, the touch-sensor-control unit 23 registers the data based on the request.

After the registration, the touch-sensor-control unit 23, when it detects an operation on the registered location, determines that the operation is made onto the virtual operation element that has the virtual operation element ID corresponding to the location, and transmits the virtual operation element ID to the function-performing unit 28 (B1). Upon receiving the virtual operation element ID, the function-performing unit 28 obtains information of the function corresponding to the virtual operation element ID from the virtual-operation-element-data-memory unit 26 (B2). Then, based on the information of the function, the function-performing unit 28 calls functions of the OS_API 25 to perform the function (B3). By doing the above, the tablet PC 10 can perform the function, which is registered in advance, based on the operation applied to the virtual operation element.

Figure 6:
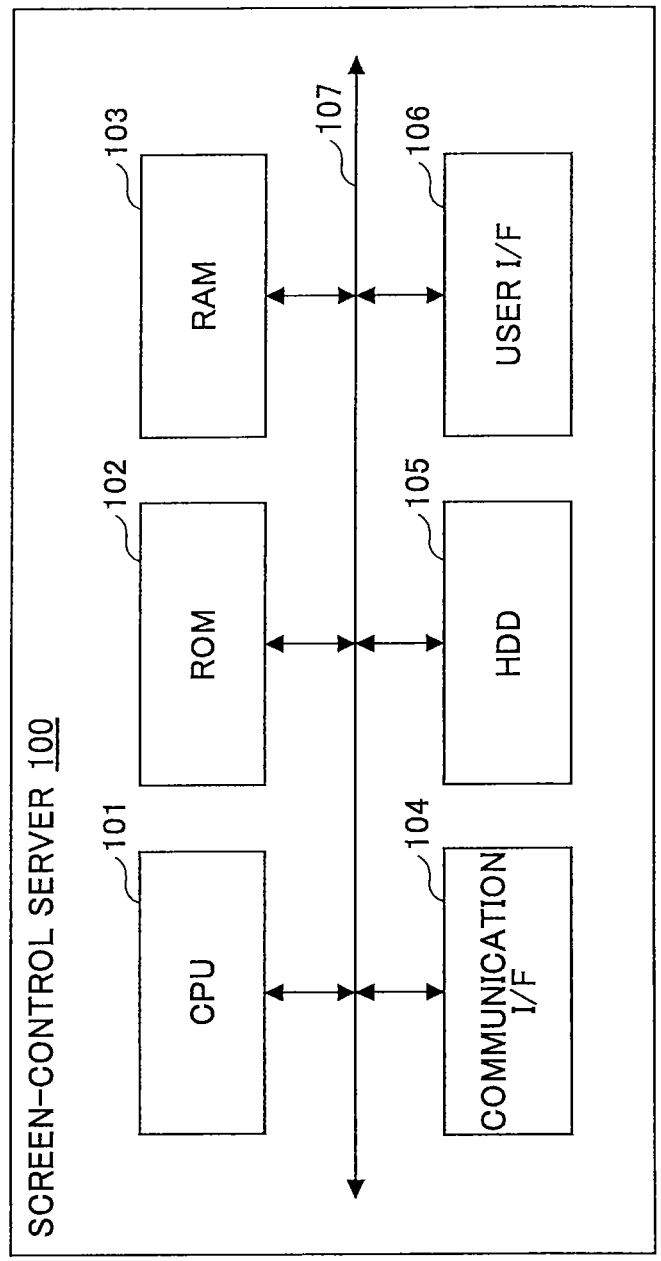
FIG. 6 is a drawing illustrating a hardware configuration of a screen control server.

Next, the screen-control server 100, which provides a function of causing the tablet PC 10 to perform the multi-display function, will be described. FIG. 6 is a drawing illustrating a hardware configuration of the screen-control server 100. The hardware of the screen-control server 100 may be a well-known PC. The screen-control server 100 includes, for example, a CPU 101, a ROM 102, a RAM 103, a communication I/F 104, an HDD (hard disk drive) 105 and a user I/F 106, which are connected to each other via a system bus 107.

By causing the CPU 101 to execute a program stored in the ROM 102 or the HDD 104, using the RAM 103 as a work area, the screen control server 100 operates and provides various functions including a function of controlling the multi-display function.

The ROM 102 is a rewritable non-volatile memory unit for storing the program the CPU 101 executes and the data that should be retained after the power supply is disconnected. The RAM 103 is a volatile memory unit which is used as a work area of the CPU 101, or used for temporarily storing data.

The communication I/F 104 is an interface for communication with various external apparatuses including the tablet PC 10. Here, it is assumed that wireless communications are available. Other types of communications may be available. Protocols used for the communications may be any protocol. Multiple interfaces may be available. The HDD 105 is a rewritable non-volatile memory unit for storing a large amount of data. The user I/F 106 is a device, such as a display, a keyboard, a mouse, etc., for a user to operate the screen-control server 100.

Figure 7:
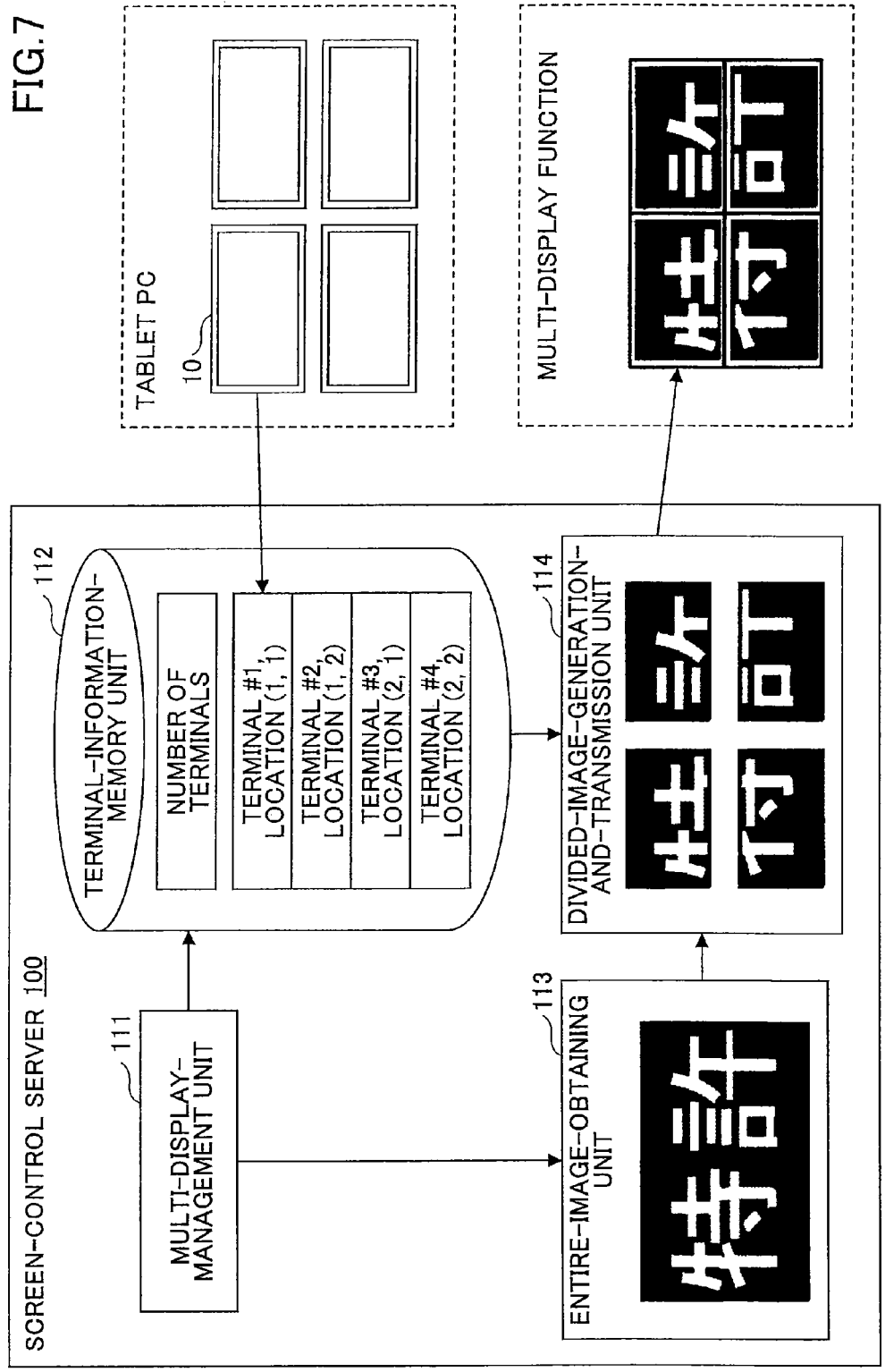
FIG. 7 is a drawing illustrating a functional block diagram of the screen control server shown in FIG. 6.

In FIG. 7, a functional configuration of the above-described screen-control server 100 for causing the tablet PC 10 to perform the multi-display function is shown. As shown in FIG. 7, the screen-control server 100 includes a multi-display-management unit 111, a terminal-information-memory unit 112, a whole-image-obtaining unit 113 and a divided-image-generation-and-transmission unit 114.

The multi-display-management unit 111 provides a function of receiving from a user a multi-display-performance request and information specifying a number of terminals used for the multi-display function. In the case where the multi-display-performance request is received, the specified number is registered in the terminal-information-memory unit 112 and a registration area of the terminal information for the specified number of terminals is reserved. In FIG. 7, the terminal information registration area for as many as four terminals #1 through #4 is reserved.

Note that the location information in the terminal information of the terminal indicates at which row and column the terminal should be placed during the multi-display function. In the registered terminal information of the terminal, at least address information of the terminal is included which is used for transmitting to the terminal the divided image data to be displayed. After the terminal information registration area is reserved in the terminal-information memory unit 112, the terminal information registration for each of the terminals is performed by obtaining necessary information through the registration request from each of the terminal apparatuses such as the tablet PCs 10. In FIG. 7, the terminal information registration area is directly connected to the tablet PC 10 by an arrow, which may give a different impression, but the registration request is actually received and handled by the multi-display-management unit 111.

Upon receiving terminal information from a necessary number of terminals, the multi-display-management unit 111 initiates the multi-display function. Specifically, the multi-display-management unit 111 obtains all the image data to be displayed provided by an application, etc., and transmits all the image data to the whole-image-obtaining unit 113. Then, the whole-image-obtaining unit 113 transmits all the image data to the divided-image-generation-and-transmission unit 114.

The divided-image-generation-and-transmission unit 114 divides all the image data into divided images for the terminals to display based on the information of the number of terminals registered in the terminal-information-memory unit 112. Let the number of terminals be four, so that all the image data is divided into four images. Then, based on the terminal information registered in the terminal-information-memory unit 112, the divided images are transmitted to the corresponding terminals (here, to the four tablet PCs 10) which should display the divided images.

Upon receiving the corresponding divided images, the tablet PCs 10 display the divided images. As a result, the multi-display function shown in the right bottom of FIG. 7 can be performed. In other words, by having multiple of the tablet PCs 10 work together, a large-size image, which is larger than the individual tablet PCs' screen, can be displayed. Here, in each of the tablet PCs 10, the multi-display application 40 obtains the corresponding divided image data and requests the display-control unit 21 to display the divided image. Note that it is necessary that each of the tablet PCs 10 be placed at an appropriate location in advance by the user in accordance with the registered terminal information in the terminal-information-memory unit 112.

Also, before the start of the multi-display function, the multi-display-management unit 111 transmits a request to each of the terminal apparatuses registered in the terminal-information-memory unit 112 to move to an entire-display mode. The reason is that the high level of visibility is achieved by the multi-display function when it is performed in the entire-display mode with the narrow-width frame and it is unlikely that the user uses the tablet PC in the hand-held manner during the multi-display function.

Also, in the case where the multi-display function is ended, the multi-display-management unit 111 receives the multi-display-quit request, and accordingly stops the image data transmission from the divided-image-generation-and-transmission unit 114 to each of the terminal apparatuses (tablet PCs 10). By this, each of the terminal apparatuses stops displaying the divided image and displays the previous screen before the start of the multi-display function.

Note that here only an example in which the screen-control server 100 controls one set of multi-display screens is shown. The screen-control server 100 may control multiple sets of multi-display screens at the same time. In such a case, during the registration of the number of terminals and the terminal information in the terminal-information-memory 112, a session ID which is associated with each of the sets of multi-display screens may also be registered. The management of the whole-image and the partial image may be implemented by using the session ID for each of the sets of multi-display screens.

Figure 8:
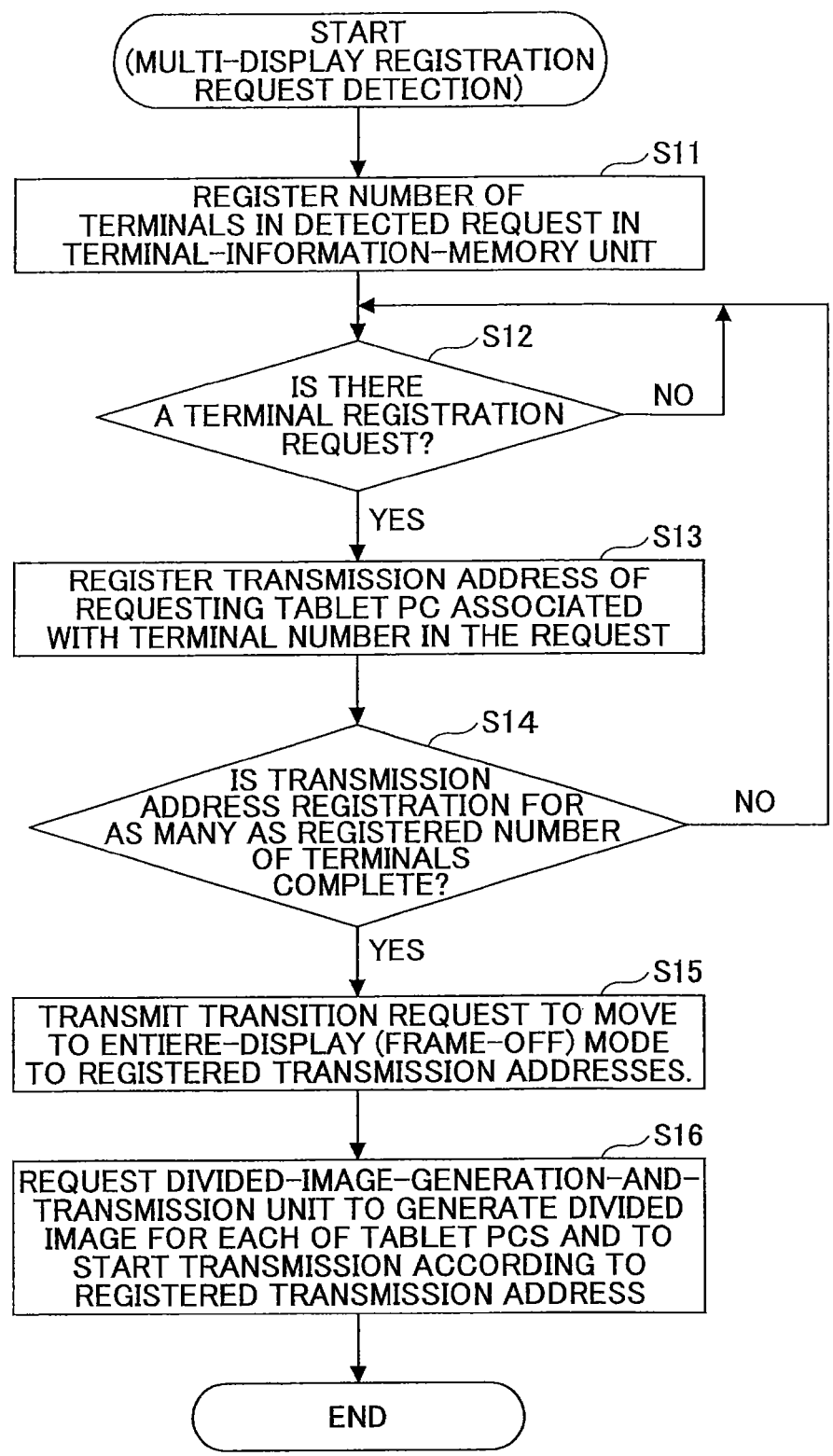
FIG. 8 is a flowchart of processes executed by a CPU of the screen-control server in the case where a multi-display-registration request is detected.

Next, processes that are executed by the CPU 101 of the screen-control server 100 in order to perform the multi-display will be described. FIG. 8 is a flowchart of processes executed by the CPU 101 in the case where a multi-display-registration request is detected.

Upon receiving the multi-display-registration request, which is a request for performing the multi-display function, from any one of the tablet PCs 10 (or other external apparatuses), the CPU 101 starts processes shown in the flowchart in FIG. 8. The CPU 101 also starts the processes in the case where the request is received via the user I/F 106.

At first in these processes, the CPU 101 registers the information of the number of terminals, which is included in the received request, in the terminal-information-memory unit 112 (S11). Then, the CPU 101 waits for a terminal registration request from the tablet PC 10 (S12). Upon receiving the terminal registration request, a transmission address for transmitting the image data to the requesting tablet PC 10, which address is associated with the terminal numbers included in the request (#1 through #4), is registered in the terminal-information-memory unit 112 (S13). This terminal registration request is transmitted by the multi-display application 40 of the tablet PC 10 in accordance with the user's operation. Note that even in the case where the terminal number is not included in the terminal registration request, the terminal number can be assigned in the order in which the terminal registration requests are received in step S13. In this case, the terminal number assignment result may be transmitted to each of the tablet PCs 10.

Next, the CPU 101 determines whether the registration of the transmission addresses is completed for as many as the number of terminals which is registered in step S11 (S14). In the case it is not completed, the process returns to step S12 and the next terminal registration request is awaited. In the case where it is completed, it is determined that the multi-display function can be started, and the process moves to step S15 for the display start.

The CPU 101 transmits the mode-transition request to each of the transmission addresses registered in the terminal-information-memory unit 112 for moving to the entire-display (frame-OFF) mode (S15). The reason is that it is preferable that the image related to the multi-display function be displayed in the entire-display mode. In the tablet PC 10, the multi-display application 40 receives the transition request and transmits it to the virtual-frame-control unit 30 to move to the entire-display mode.

The CPU 101 requests the divided-image-generation-and-transmission unit 114 to generate the divided image corresponding to the tablet PCs 10 and to start the transmission according to the registered address information (S16). The multi-display function is performed by the corresponding divided images being received by the multi-display applications 40 of the tablet PCs 10, being transmitted to the display-control units 21, and being displayed on the displays 15. This is the end of the processes in FIG. 8. Afterward, the multi-display function is continued as long as the divided-image-generation-and-transmission unit 114 continues transmitting the divide image and as long as the multi-display application 40 of each of the tablet PCs 10 continues running.

Figure 9:
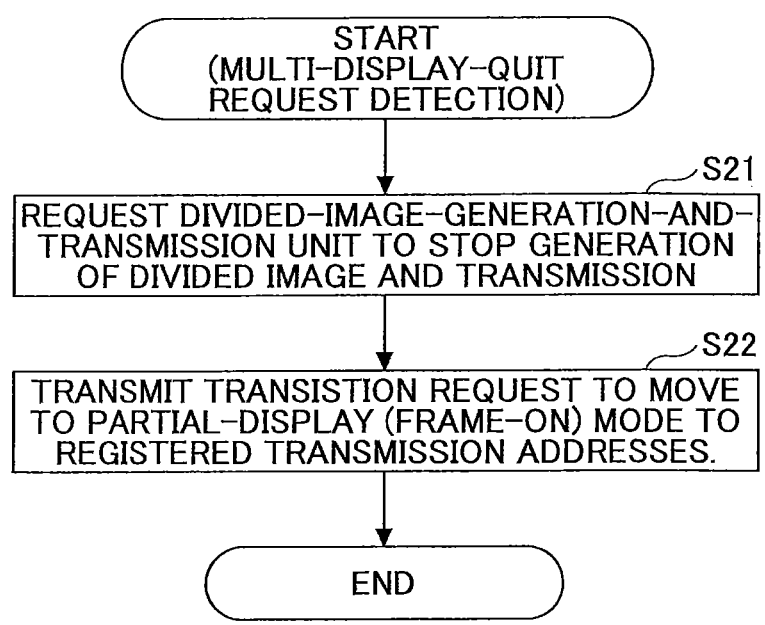
FIG. 9 is a flowchart of a process performed by the CPU of the screen control server in the case where a multi-display-quit request is detected.

In FIG. 9 is shown a flowchart of processes executed by the CPU 101 in the case where a multi-display-quit request is detected. Upon detecting the multi-display-quit request via the user I/F 106, the CPU 101 starts processes shown in the flowchart in FIG. 9. Upon detecting the multi-display-quit request from one of the tablet PCs performing the multi-display function, the CPU 101 starts the same processes.

In these processes, the CPU 101 first requests the divided-image-generation-and-transmission unit 114 to stop generation and transmission of the divided image (S21). Upon receiving the request, the divided-image-generation-and-transmission unit 114 stops generation and transmission of the divided image. With this, the multi-display function ends.

The CPU 101 transmits a transition request to each of the transmission addresses registered in the terminal-information-memory unit 112 to move to the partial-display (frame-ON) mode (S22). The reason is, after the end of the multi-display, it is expected that each of the tablet PCs 10 is used independently and the partial-display mode is preferable. In the tablet PC 10, the multi-display application 40 receives the transition request, transmits it to the virtual-frame-control unit 30 to move to the partial-display mode. This is the end of the processes of FIG. 9. Here, the information of the tablet PCs 10 registered in the terminal-information-memory unit 112 may be deleted or kept in case the multi-display function is resumed.

Figure 10:
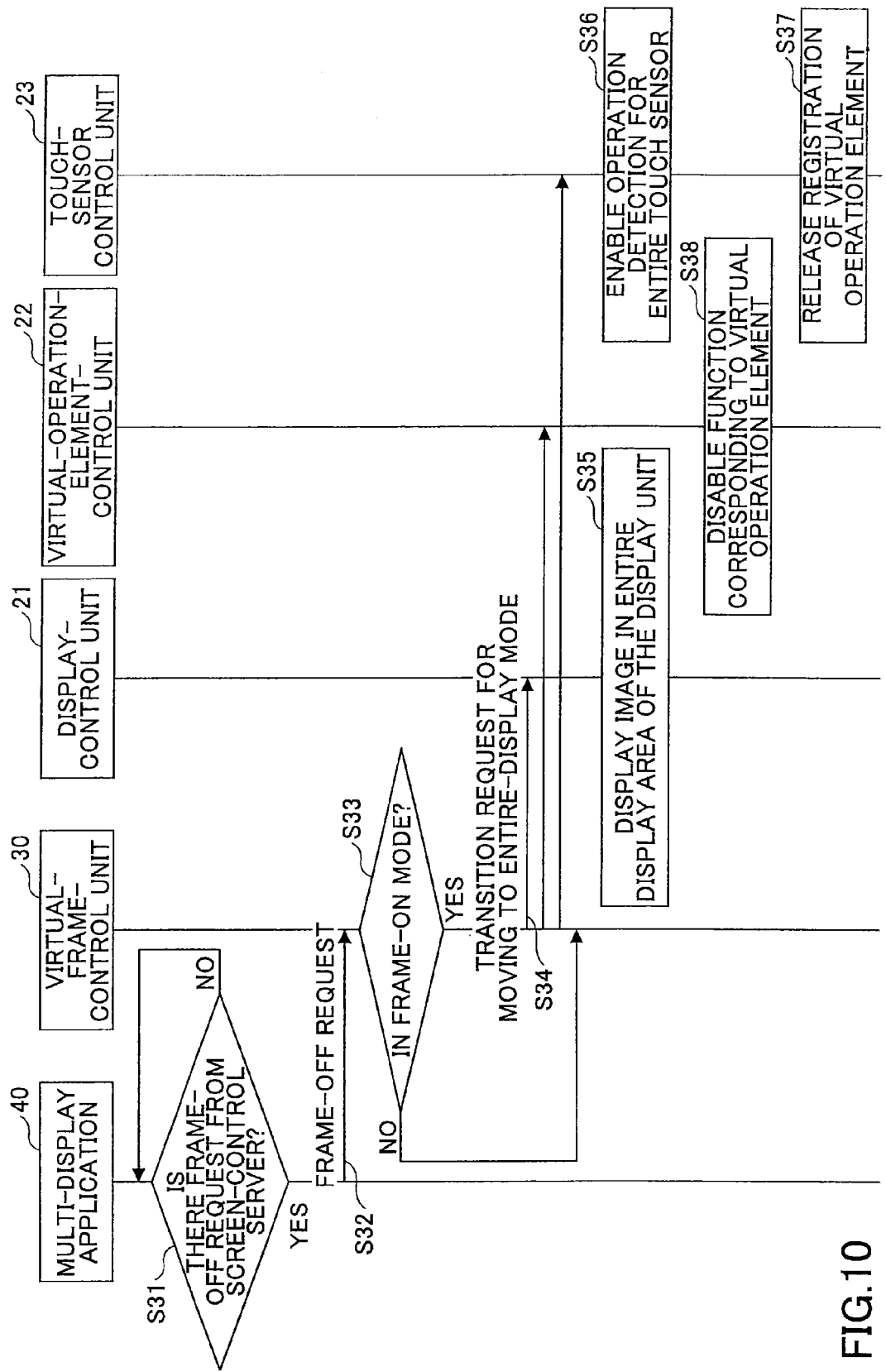
FIG. 10 is a sequence chart illustrating examples of processes of the tablet PC during the tablet PC's transition from the entire-display mode to the partial-display mode.

In the following, processes of units of the tablet PC 10 for the mode switching will be described. In FIG. 10 is shown an example of a sequence chart illustrating processes of the tablet PC 10 during the transition from the entire-display mode to the partial-display mode. These processes of the units are implemented by the CPU 11 executing a predefined program. The same applies to the processes in FIG. 11 and FIG. 12.

In the processes in FIG. 10, the multi-display application 40 monitors the reception of a frame-OFF request (transition request to the entire-display mode) from the screen-control server 100 (S31). Upon receiving the frame-OFF request, the multi-display application 40 transmits it to the virtual-frame-control unit 30 (S32).

Upon receiving the frame-OFF request, the virtual-frame-control unit 30 determines whether it is in the frame-ON mode (the partial-display mode) (S33). In the case where it is not in the frame-ON mode, that is, it is in the frame-OFF mode (the entire-display mode), the virtual-frame-control unit 30 does nothing. In the case where it is in the frame-ON mode, on the other hand, the virtual-frame-control unit 30 transmits the transition request to the display-control unit 21, the virtual-operation-element-control unit 22 and the touch-sensor-control unit 23 so that the tablet PC 10 moves to the entire-display mode (S34).

Upon receiving this transition request, the display-control unit 21 controls the display 15 so that an image is displayed in the entire display area of the display 15 (S35). Accordingly, the display of the frame and the virtual operation element ends. Also, the size of the image displayed in the effective display area is changed. It is not necessary to change the content itself of the image displayed in the effective display area.

Upon receiving the request in step S34, the touch-sensor-control unit 23 enables the operation detection of the entire touch sensor 16 (S36). Also, the registration of the virtual operation element requested by the virtual-operation-element-control unit 22 (refer to FIG. 12) is released (S37). By the processes above, the function of the virtual operation element is disabled.

Upon receiving the request in step S34, the virtual-operation-element-control unit 22 disables the function of the virtual operation element (S38). In other words, the virtual-operation-element-control unit 22 sets itself not to do the corresponding operation even if the virtual operation element is operated. Although the information indicating that the virtual operation element is operated will no longer be transmitted to the virtual-operation-element-control unit 22 because of the process in step S37, the function of the virtual operation element is disabled just in case.

The tablet PC 10 moves to the entire-display mode as a result of the processes in steps S35 through S38. In the above processes, the virtual-frame-control unit 30 functions as a switching unit in step S34. The virtual-frame-control unit 30 functions as a determination unit in step S33.

Note that the tablet PC 10 may be moved to the entire-display mode not only by the request from the screen-control server 100 but also by the operation of the tablet PC 10 itself. In the case where the tablet PC 10 is put on a table or is fixed to some device in order for the user to view some contents such as a video, it is not necessary for the user to hold it in his hand and it is preferable that the screen size be larger. Therefore, in this case, the tablet PC 10 may be moved to the entire-display mode by the user request, or by the acceleration sensor 17 detecting that the tablet PC 10 is not moving for a predefined time. These kinds of mode transition functions may be implemented in the OS 20 or in a contents-playing application, which is not shown in the figure. At any rate, if the frame-OFF request is transmitted to the virtual-frame-control unit 30 as shown in FIG. 10, using the request as a trigger, the tablet PC 10 is able to change the mode.

Figure 11:
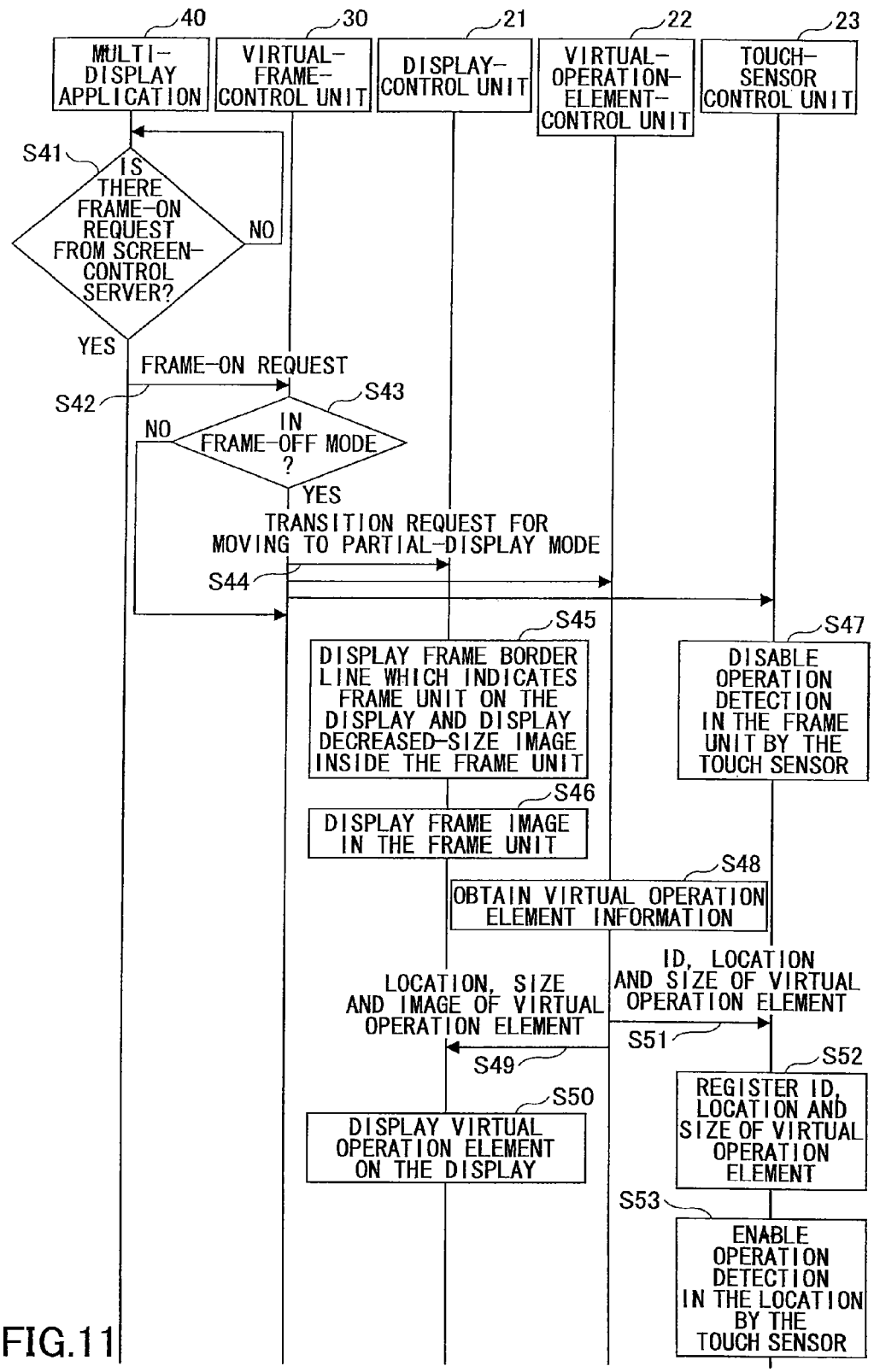
FIG. 11 is a first example of a sequence chart illustrating processes of the tablet PC during the tablet PC's transition from the partial-display mode to the entire-display mode.

Next, in FIG. 11, a first example of a sequence chart illustrating processes of the transition from the partial-display mode to the entire-display mode is shown. In the processes shown in FIG. 11, the multi-display application 40 monitors the reception of a frame-ON request (transition request to the partial-display mode) from the screen-control server 100 (S41). Upon receiving the request, the multi-display application 40 transmits it to the virtual-frame-control unit 30 (S42).

Upon receiving the frame-ON request, the virtual-frame-control unit 30 determines whether it is in the frame-OFF mode (the entire-display mode) (S43). In the case where it is not in the frame-OFF mode, that is, where it is in the frame-ON mode (the partial-display mode), the virtual-frame-control unit 30 does nothing because a mode transition process is not necessary. In the case where it is in the frame-OFF mode, however, the virtual-frame-control unit 30 transmits the transition request to move to the partial-display mode to the display-control unit 21, the virtual-operation-element-control unit 22 and the touch-sensor-control unit 23 so that the tablet PC 10 moves to the partial-display mode (S44).

Upon receiving the request, the display-control unit 21 displays a frame border line on the display 15 which indicates a frame unit (the peripheral area 53 in FIG. 2B), and displays an image in a decreased size in the image area inside the frame unit (S45). In other words, the display-control unit 21 determines the area inside the frame unit as the effective area in which a screen generated by an application other than the virtual-frame-control unit 30 or by the OS is displayed. The information indicating the range of the effective area may be included in the partial-display-transition request which is transmitted from the virtual-frame-control unit 30 to the display-control unit 21. Note that in the process in step S45, it is not necessary to change the content of image itself which is displayed in the effective display area. Then, the display-control unit 21 displays a predefined frame image in the frame unit of the display 15 (S46). Regarding the predefined frame image, it may be transmitted from the virtual-frame-control unit 30 or may be stored in a location which the display-control unit 21 is able to refer to.

Upon receiving the request in step S44, the touch-sensor control unit 23 disables the operation detection of the touch sensor 16 for the frame unit (S47). In other words, in the case where an operation on the frame unit is detected, the detection result is discarded and the corresponding operation is not performed. The information indicating the range of the frame unit (the range may be viewed as the area other than the effective area) may be included in the partial-display-transition request which is transmitted from the virtual-frame-control unit 30 to the display-control unit 21.

Upon receiving the request in step S44, the virtual-operation-element-control unit 22 obtains from the virtual-operation-element-data-memory unit 26 information of the virtual operation element which should be enabled (S48). Then, the virtual-operation-element-control unit 22 transmits the location, the size and the image of the virtual operation element to the display-control unit 21 (S49).

The display-control unit 21 displays the image of the operation element on the display 15 (S50). Because the virtual operation element is supposed to be located in the frame unit, the display-control unit 21 may determine whether the display location of the operation element is in the frame unit. In the case where the display location is not in the frame unit, the display-control unit 21 may go to an error process.

The virtual-operation-element control unit 22 transmits the virtual operation element ID, the location and the size of the virtual operation element to the touch-sensor-control unit 23 (S51). The touch-sensor-control unit 23 registers the information received in step S51 as the effective virtual operation element information (S52) and enables the operation detection of the corresponding location by the touch sensor 16 (S53). As a result of the processes above including the registration in step S52, in the case where the touch sensor 16 detects an operation at the location where the virtual operation element is placed, the touch-sensor-control unit 23 transmits the virtual operation element ID of the virtual operation element to the virtual-operation-element-control unit 22.

As a result of the above processes in steps S45 through S53, the tablet PC 10 moves to the partial-display mode. In the above processes, the virtual-frame-control unit 30 functions as a switching unit in step S44. The virtual-frame-control unit 30 functions as a determination unit in step S43, and so does the display-control unit 21 in step S50. The display-control unit 21 functions as the third control unit in step S46. The touch-sensor-control unit 23 functions as the first control unit in step S47. The touch-sensor-control unit 23 functions as the second control unit in step S53.

Figure 12:
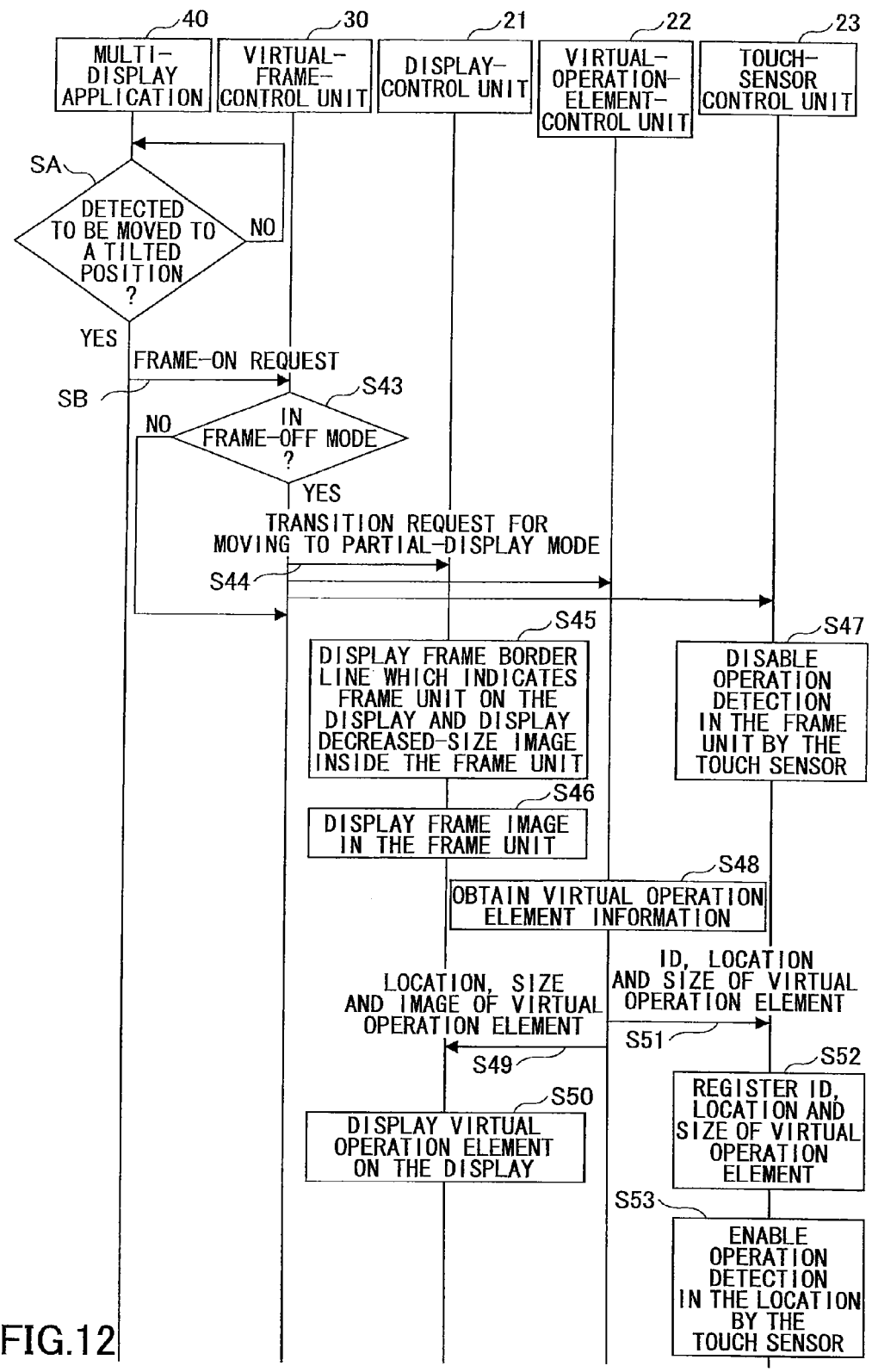
FIG. 12 is a second example of a sequence chart illustrating processes of the tablet PC during the tablet PC's transition from the partial-display mode to the entire-display mode.

In FIG. 12, a second example of a sequence chart illustrating processes of the transition from the partial-display mode to the entire-display mode is shown. This is an example in which the mode is switched based on the acceleration detection by the acceleration sensor 17. Because the processes in FIG. 12 is the same as the processes in FIG. 11 except for step S41 and S42 in FIG. 11 being replaced by step SA and step SB in FIG. 12, only the different steps will be described.

The acceleration-sensor-control unit 24, which monitors the acceleration detection result by the acceleration sensor 17 as needed, determines whether it is detected that the tablet PC 10 is moved to a tilted position based on the acceleration detection result (SA). In the case where the movement of the tablet PC 10 is determined to be detected, the frame-ON request is transmitted to the virtual-frame-control unit 30 (SB). Upon receiving the frame-ON request, the virtual-frame-control unit 30 causes the tablet PC 10 to move to the entire-display mode by processing the same steps as step S43 and the following shown in FIG. 11.

The entire-display mode is a mode which is good for the multi-display function. A situation is expected in which multiple tablet PCs 10 in the entire-display mode are placed on a table next to each other. In this situation, it may be often the case that the tablet PC 10 is placed in such a way that the surface of the display 15 of the tablet PC 10 is horizontal.

In this situation, in the case where the tablet PC 10 is moved to a tilted position, the movement may suggest the user's intention of holding the tablet PC 10 to use it. Therefore, it is expected that if the movement detection is used as a trigger for the tablet PC 10 to move to the partial-display mode, which is more suitable for the user who intends to hold the tablet PC 10 to use it, the number of user's operations necessary for the mode change will be reduced and the user's operability will be increased.

Note that the trigger for the mode change is not limited to the "detection of the movement to the tilted position". There is a case where the tablet PC 10 is fixed to some device for the multi-display function and the tablet PC 10 in the entire-display mode is not placed in a horizontal position but placed in a tilted position. Therefore, the trigger may be a "detection of a movement of the tablet PC 10", a "detection of a direction change of the tablet PC 10", a "detection of a rotational movement of the tablet PC 10", etc.

According to the tablet PC 10 described above, when the effective area of the display area of the display 15 in which images are displayed is determined, the operation detection by the touch sensor 16 is disabled outside the effective area. By this, the area which will be touched by the user when the user holds the tablet PC 10 can be selectively excluded from the image display area or excluded from the operation detection area even in the case where the width of the frame 51 is caused to be narrow in order to increase the multi-display benefit. Therefore, also in the case of using the tablet PC 10 as a standalone PC, the user can use the tablet PC 10 comfortably without having difficulty in viewing the image and without making unintentional operations. Thus, the user can use the tablet PC 10 comfortably both in the standalone mode and the multi-display mode.

The tablet PC 10 can switch between the first mode and the second mode. In the first mode, the effective area is the entire display area of the display 15. In the second mode, the effective area is a portion of the display area of the display 15. Thus, the first mode can be selected in the case of the multi-display mode and the second mode can be selected in the case of the standalone mode. The tablet PC 10's image display and the operation detection in accordance with the usage can be easily controlled by the external apparatus.

This display mode change can be triggered based on the acceleration detection result by the acceleration sensor. As a result, without requiring a user's switching operation, the mode change is automatically performed by detecting a situation which requires the mode change.

In the display area outside the above effective area of the display 15, the image of the operation element can be displayed and the operation, which is detected by the touch sensor 16 in the area where the image is being displayed, can be enabled. As a result, the area outside the effective area can become useful because the user's operation can be received via the virtual operation element displayed outside the effective area.

In the second mode, the area of the display area of the display 15 excluding the peripheral area is defined as the effective area. It can be expected that the area the user touches is mainly the peripheral area. It is useful that this peripheral area can be excluded from the effective area and the user can hold it in his hand and use it comfortably.

Further, in the second mode, the predefined frame image is displayed in the display area outside the effective display area of the display 15. By this, the user can easily recognize the effective area and the non-effective area and, even in the case where the image is only displayed in the partial area of the display 15, it does not look awkward.

Further, the present invention is not limited to the above embodiments, and various variations and modifications in the configurations of the apparatuses, the content of the processes, the data configurations, the number of the apparatuses used, etc., may be made without departing from the scope of the present invention. For example, the function of the above screen-control server 100 may be included in any one of the tablet PCs 10. In this case, the tablet PC 10 that includes the function of the screen-control server 100 can control the multi-display in which the tablet PC 10 itself participates. In the case where the destination of the divided image transmission by the divided-image-generation-and-transmission unit 114 is the tablet PC 10 itself, the image transmission is achieved by using an inter-process communication between the process which implements the function of the screen-control server 100 and the process which implements the function of the multi-display application 40.

In the above configuration, it is difficult for the tablet PC 10 to receive the multi-display-quit request because there is no place for the operation element on the display 15 during the multi-display function in the entire-display mode. Therefore, as shown in FIG. 12, in the case where the mode change to the partial-display mode is triggered by the acceleration detection by the acceleration sensor, it is preferable that the mode change be considered as the multi-display-quit request.

Not only in the case where the mode change is triggered by the tablet PC 10 which includes the function of the screen-control server 100, but also in the case where the mode change is triggered by other tablet PCs 10 which participate in the multi-display, it is preferable that the mode change be considered as the multi-display-quit request. In this way, the multi-display-quit request can be easily transmitted even in the case where the tablet PC 10 does not include a fixed operation element.

Also, the function of the screen-control server 100 and the function of the tablet PC 10 may be distributed in the multiple apparatuses, which work together for implementing the functions. This includes that the function of the screen-control server 100 may be partially included in the tablet PC 10, or that the function of the tablet PC 10 may be partially included in the screen-control server 100. In the above embodiments, examples are shown in which two modes, the entire-display mode and the partial-display mode, are included as the display modes. More than two modes may be included in the display modes. In this case, each virtual operation element of the modes may have a different type and function.

In the present embodiment, it is not essential to use the multi-display function. Even in the case where the tablet PC 10 is used in the standalone mode, it is useful to be able to switch between the modes in accordance with the situation because there is a situation where it is important to have a large screen, and there is a situation where it is important for the user to operate the tablet PC 10 with his/her hand holding it. It is not essential to include the virtual operation element. The implementation of the display system or the display apparatus according to the present embodiment is not limited to the tablet PC 10. The display system or the display apparatus according to the present embodiment can be implemented by any system or apparatus which includes an image displaying function. The above-described embodiments and configurations of operation examples and modified examples can be used in any combination as long as the combination does not have contradiction.

The present invention can be implemented in any convenient form, for example using dedicated hardware, or a mixture of dedicated hardware and software. The present invention may be implemented as computer software implemented by one or more networked information processing apparatuses. The network can comprise any conventional terrestrial or wireless communications network, such as the Internet. The information processing apparatuses can comprise any suitably programmed apparatuses such as a general purpose computer, a personal digital assistant, a mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD-ROM, a magnetic tape device or a solid state memory device. The hardware platform includes any desired kind of hardware resources including, for example, a central processing unit (CPU), a random access memory (RAM), and a hard disk drive (HDD). The CPU may be implemented by any desired type of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory of a primary memory of the apparatus, while the HDD may function as a secondary memory of the apparatus.

The present application is based on and claims the benefit of priority of Japanese Priority Application No. 2013-047708 filed on Mar. 11, 2013, with the Japanese Patent Office, the entire contents of which are hereby incorporated by reference.

What is claimed is:
1. A display system comprising:
a display including a sensor which detects an operation in a display area of the display,
processing circuitry configured to
switch a plurality of modes upon request, the plurality of modes including (1) a first mode in which an effective area of the display area is an entire area of the display area, the effective area being an area on which an image is displayed, and, in order to display a single image by working together with other displays, one of a plurality of divided images divided from the single image is displayed in the effective area, and (2) a second mode in which the effective area is a part of the display area, and the one of the plurality of divided images is not displayed in the effective area;
determine that the effective area is the entire area of the display area when the first mode is selected, and that the effective area is the display area excluding a peripheral area of the display area when the second mode is selected, and
disable the operation detection by the sensor outside the determined effective area.

2. The display system as claimed in claim 1, wherein the display includes an acceleration sensor and the processing circuitry switches the modes based on an acceleration detected by the acceleration sensor.

3. The display system as claimed in claim 1, wherein the processing circuitry is further configured to display an image of an operation element outside the effective area of the display area of the display and not to disable the operation detection by the sensor in an area where the image of the operation element is displayed.

4. The display system as claimed in claim 1, wherein the processing circuitry is further configured to display a predefined frame image in the display area of the display excluding the effective area in the second mode.

5. A display method for a display system which includes a display with a sensor for detecting an operation in a display area of the display, the display method comprising:

switching a plurality of modes upon request, the plurality of modes including (1) a first mode in which an effective area of the display area is an entire area of the display area, the effective area being an area on which an image is displayed, and, in order to display a single image by working together with other displays, one of a plurality of divided images divided from the single image is displayed in the effective area, and (2) a second mode in which the effective area is a part of the display area, and the one of the plurality of the divided images is not displayed in the effective area;

determining that the effective area is the entire area of the display area when the first mode is selected, and that the effective area is the display area excluding a peripheral area of the display area when the second mode is selected, and disabling the operation detection by the sensor outside the effective area.

* * * * *